United States Patent

Harris

[11] Patent Number: 5,040,099
[45] Date of Patent: Aug. 13, 1991

[54] MOTORCYCLE SAFETY HELMET

[76] Inventor: Garry Harris, Star Rte., Box 35, Conrad, Mont. 59425

[21] Appl. No.: 544,964

[22] Filed: Jun. 28, 1990

[51] Int. Cl.⁵ .............................. F21L 15/14; B62J 6/04
[52] U.S. Cl. .................................... 362/72; 362/105; 362/106; 362/802
[58] Field of Search .................. 362/72, 105, 106, 802; 340/479, 464, 432, 943, 942

[56] References Cited

U.S. PATENT DOCUMENTS

| | | | |
|---|---|---|---|
| 4,559,586 | 12/1985 | Slarve | 362/72 |
| 4,760,373 | 7/1988 | Reilly | 362/72 |
| 4,891,736 | 1/1990 | Gouda | 362/72 |
| 4,945,458 | 7/1990 | Batts et al. | 362/106 |
| 4,956,752 | 9/1990 | Foglietti | 362/105 |

*Primary Examiner*—Ira S. Lazarus
*Assistant Examiner*—Y. Quach
*Attorney, Agent, or Firm*—Frank D. Gilliam

[57] ABSTRACT

A riders helmet for a motorcycle or the like having a rearward facing auxiliary brake lamp secured thereto spaced from and connected by an optic or sonic link to the brake light operating system of the motorcycle. The auxiliary lamp is caused to illuminate with the illumination of the brake lamp of the motorcycle.

8 Claims, 2 Drawing Sheets

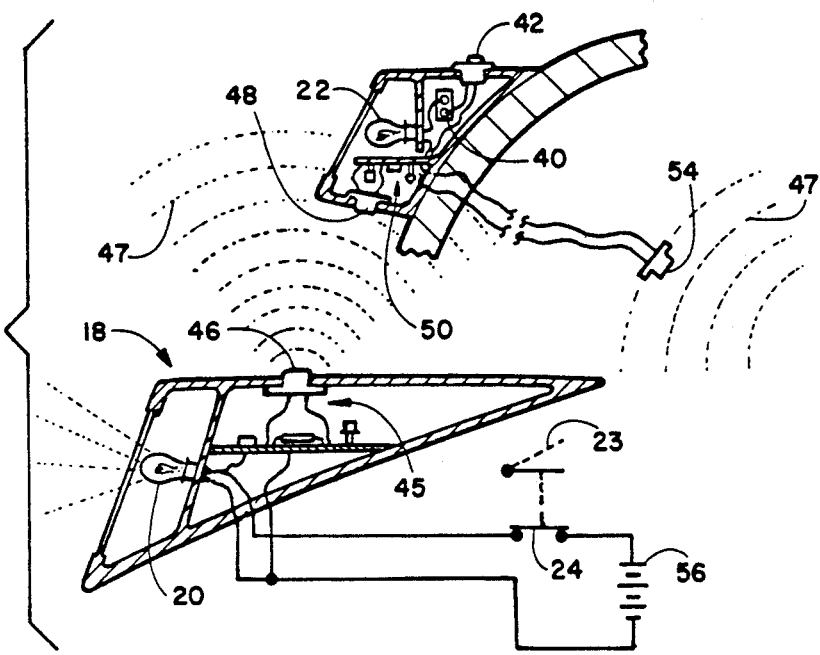
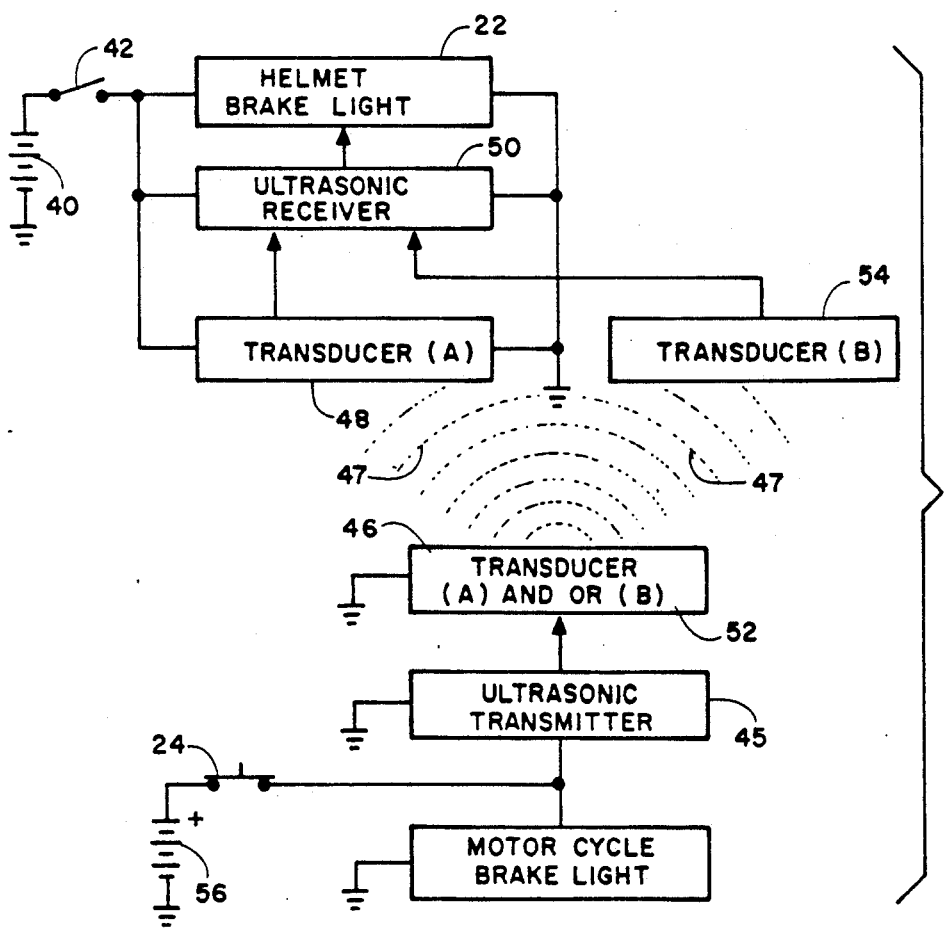

MOTORCYCLE SAFETY HELMET

BACKGROUND OF THE INVENTION

The invention relates to safety head gear for motorcycle riders and more particularly to a helmet mounted auxiliary break lamp positioned substantially in the direct line of sight of drivers of vehicles following behind motorcycles with the operators thereof wearing the brake lamp equipped motorcycle helmet.

Present Federal law requires that all new automobiles have a centrally positioned elevated auxiliary rear stop lamp. No such law presently exists for motorcycle riders as there is no elevated means on the structure of the motorcycle for positioning such an elevated light thereon. There is an obvious safety advantage for having an elevated auxiliary stop lamp for a motorcycle.

U.S. Pat. No. 4,559,586 teaches a harness or cable connection between the stop light and a helmet attached lamp. This teaching has principle disadvantages in the rider via the interconnecting electrical cable is tethered to the motorcycle whereby intentional or accidental dismounting from the motorcycle without disconnecting the motorcycle attachment could cause injury to the rider or damage the electrical connector or vehicle lighting system to which it is attached or the rider may forget to connect or reconnect the cable rendering the auxiliary stop lamp useless.

The following U.S. Pat. Nos. teach various lighting, radio transmission and interconnection methods of the prior art that can be utilized between the electrical system of a motorcycle and an auxiliary helmet positioned lamp or lamps: 3,474,451; 3,835,454; 4,186,429, 4,559,516; 4,559,586; 4,631,644; 4,641,127; 4,660,528; 4,760,373.

The following German Patents teach interconnection between the electrical system of the motorcycle and the light system of the helmet via wireless radio: 23,619,947 and 2,726,322.

The obvious disadvantage to radio interconnection means for controlling an auxiliary helmet positioned stop lamp is the natural interference which occurs due to the low elevation of the transmitter located on the motorcycle and the helmet contained receiver. Signals are periodically interrupted, distorted by the surrounding traffic, interference between other motorcycles in the immediate vicinity which are similarly equipped, etc. Power consumption requirement is large, particularly the helmet portion of the system. These and other problems continue to exist in minipowered radio communication systems.

There is a continuing need to provide improved safety devices for riders of motorcycles and it is particularly important to improve the visible recognition of a motorcycle and rider at night by the drivers of automobiles following in the near rear vicinity of the motorcycle and rider. The improved elevated stop lamp of this invention would advance the safety of night motorcycle riders by providing an elevated stop lamp, helmet mounted, which is not attached in any way to the motorcycle or interconnected by wireless radio.

SUMMARY OF THE INVENTION

In accordance with the device of the present invention the above-described and other disadvantages of the prior art are overcome by providing an auxiliary brake lamp activated by the brake lamp switch of the motorcycle that is positioned on the rear of a motorcycle riders helmet which is not physically connected to the motorcycle or by radio signal means.

A principle object of this invention is to provide an elevated stop lamp for a motorcycle or the like which is operable without physical interconnection to the electrical system of the motorcycle.

Another object of this invention is to provide an elevated stop lamp for a motorcycle or the like which is operable without physical connection to the electrical system of the motorcycle or interconnected by wireless radio means.

Still another object of this invention is to provide an elevated stop lamp for a motorcycle that is positioned on the rider's helmet and is illuminated by the operation of the motorcycle brakes without physical interconnection to the motorcycle light electrical system and is not effected by the surrounding environment of the motorcycle.

These and other objects and features of the present invention will be apparent to those skilled in the art after a consideration of the following detailed description taken in conjunction with the accompanying drawing figures in which a preferred form of this invention is shown.

BRIEF DESCRIPTION OF THE DRAWING FIGURES

FIG. 4 depicts a cutaway showing of a portion of the motorcycle and the helmet with the position of the components comprising a second embodiment of the present invention; and FIG. 5 depicts a block diagram showing of the operating components of the second embodiment of the invention.

DETAILED DESCRIPTION OF THE PREFERRED EMBODIMENTS OF THE INVENTION

Figure 1:
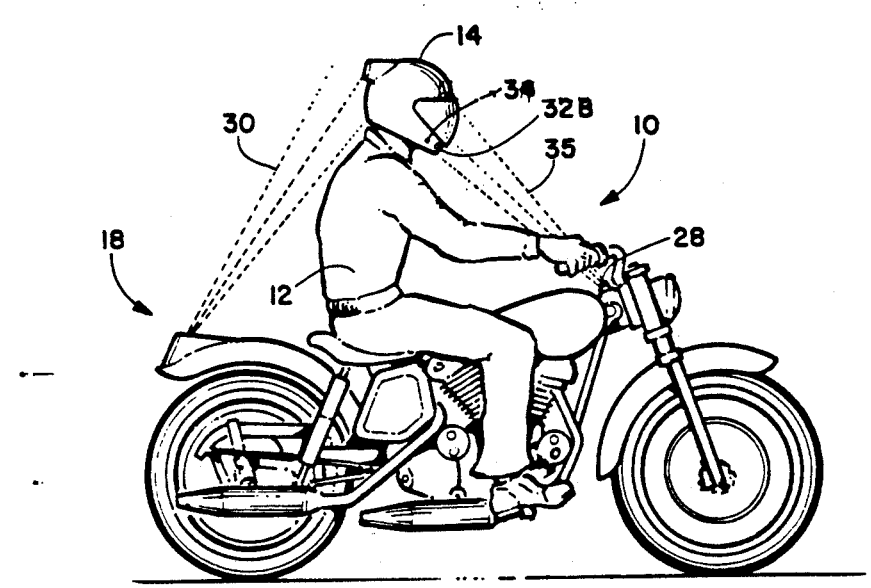
FIG. 1 is a side view showing of a motorcycle and a rider wearing a safety helmet with both embodiments of the present invention operable thereon.
Figure 2:
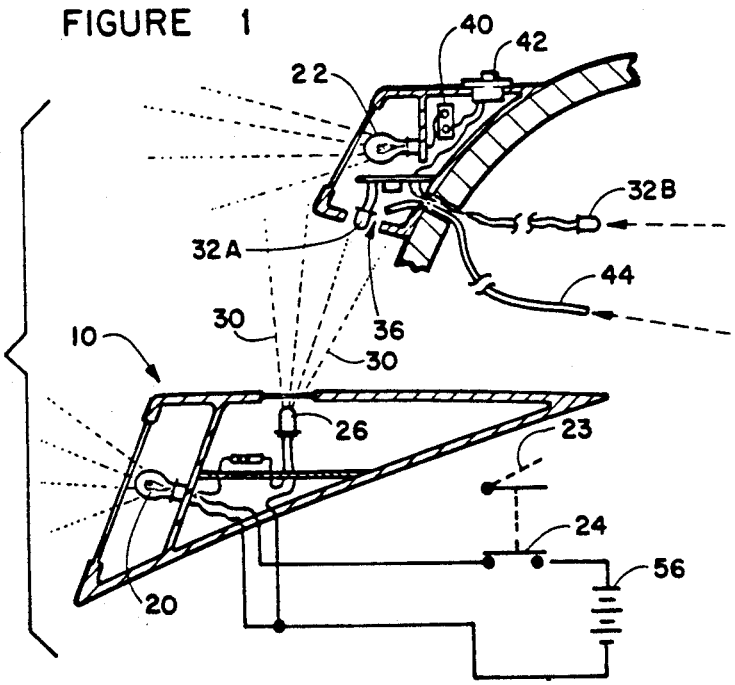
FIG. 2 is a cutaway showing of a portion of the motorcycle and helmet with the position of the components comprising a first embodiment of the invention.
Figure 3:
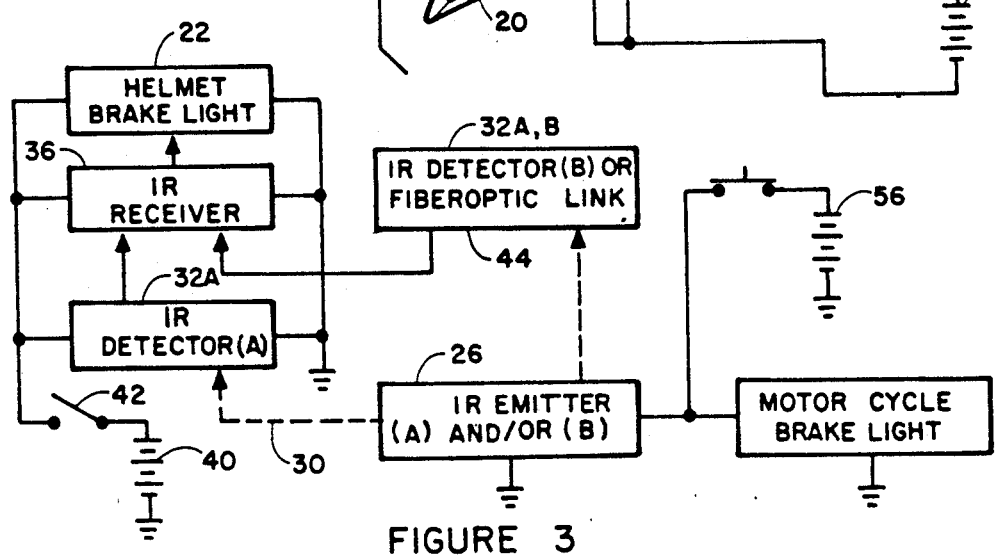
FIG. 3 depicts a block diagram showing of the operating components of the first embodiment of the present invention.

Referring now to the various drawing Figures and specifically to drawing FIGS. 1-3 which depict the first embodiment of the present invention.

FIG. 1 depicts a side view showing of a motorcycle 10, rider 12 and helmet 14 worn by the rider. The rear portion 18 of the motorcycle includes a conventional motorcycle equipped stop light 20 which illuminates by operation of the brake system during stopping of the forward movement of the motorcycle. Positioned on the rear upper portion of the helmet 14 is an auxiliary brake or stop lamp 22. The lamp 20 is illuminated by the application of the motorcycle rear brake pedal 23 mechanically operates a brake light switch 24 (shown in a closed position) in a known and conventional manner. Connected in parallel with the motorcycle equipped stop light 20 is either one or two small infra-red emitters, such as for example a TIL 906-1 jIR LED, manufactured by TEXAS INSTRUMENTS, or an equivalent thereto. With application of the rear motorcycle brakes the motorcycle equipped stop lamp illuminates and the one or two infra-red emitters emit infra-red frequency light. One of the infra-red emitters 26 may be positioned on the rear of the motorcycle as shown in drawing FIGS. 1 and 2 and/or the second infra-red emitter 28 is located in front of the operator as shown in drawing FIG. 1. Light from infra-red emitter 26 is directed along arrows 30 forming a beam of infra-red illumination toward the helmet 14. Either the infra-red lamps 26 and 28 can be used alone to practice the invention or be used together for redundancy in the event of light emitting failure of either.

Positioned on the helmet is a first infra-red detector 32A of the type TIL 413 IR PHOTO DIODE, or equivalent thereto manufactured by TEXAS INSTRUMENTS and/or a second infra-red detector 32B of the same type positioned at the lower front area 34 of the helmet within the beam 35 of infra-red emission from infra-red emitter 28. When either infra-red detector receives infra-red illumination a receiver switching circuit 36 well known in the electronic art receives the infra-red signal and uses that signal to switch applying power from a battery 40 carried by the helmet which to helmet auxiliary stop lamp 22 illuminating the lamp. An "ON" "OFF" switch 42 is wired in series with the receiver switch and the battery. When the "ON" "OFF" switch is in the "ON" position the auxiliary stop lamp 22 will illuminate each time either infra-red detector detects infra-red radiation. Also shown in drawing FIG. 2 is an optic fiber 44 which extends from the lower front area 34 of the helmet to the detecting surface of the infra-red detector 32A. The optic fiber 44 can be used in place of the infra-red detector 32 for the same purpose when the rear infra-red detector 32 is used or in conjunction therewith to ensure that the auxiliary stop lamp illuminates each time the motorcycle stop light illuminates.

Referring now to drawing FIGS. 1, 4 and 5 which depict a second embodiment of the present invention. In this embodiment, ultra sonic sound is used to practice the invention. On the rear of the motorcycle an ultra sonic transmitter 45 and a transducer 46 of the apiezo Ceramic type manufactured by MURATA ERIE. The transducer emits sonic sound waves 47 at the frequency of transmitter 45. The transducer is substituted for the infra-red emitter 28 and in the helmet a receiving transducer 48 detects the sonic beam from transmitting transducer 46 and a ultrasonic receiver 50 electrically connected to receiving transducer 48 receives and detects the sonic frequency and operates the switching circuit from a open to a closed condition. A second transmitting transducer 52 either alone or in combination with transmitting transducer 46 is located a the forward area of the motorcycle in parallel with or in place of transmitting transducer 46, as hereinbefore discussed above in the discussion of the second infra-red emitter. The sonic sound transmitted from the transmitting transducer 52 is received by a receiving transducer 54 in parallel with or in place of the receiving transducer 48.

The first embodiment directed to infra-red frequency light emitting and receiving system operates as follows, when the brake system of the motorcycle is operated the conventional rear stop light on the motorcycle illuminates, and simultaneously therewith one or both of the infra-red emitters are energized transmitting an infra-red light beam toward one or both of the infra-red detectors located on the helmet, the received light signal detector operates the switch circuit which connects the auxiliary helmet positioned stop light to also illuminate provided that the helmet located "ON" "OFF" switch is in the "ON" position. The illuminating of the auxiliary helmet stop light is continually repetitive upon all applications of the brakes. In another configuration of this embodiment, a simple inexpensive optic fiber is used to transfer the light from the front area of the motorcycle received by the front of the helmet to the light operated electronic switch.

The second embodiment operates substantially in the same manner except, as above stated, in place of the infra-red emitters sonic transducers are utilized. These sonic transducers are not unlike those used to focus automatic camera and the like. which transmit a high frequency sound which is received by a like transducer which operates a switch circuit when a specific audio sound received.

In all of the above embodiments, interference is highly unlikely as the transmitted beam either infra-red or sonic only has sufficient switch operating strength to operate the auxiliary stop light in the vicinity of the helmet and the beam is rather narrow and disperses sufficiently to be ineffective at a short distance past the area of the top of the motorcycle operator. Further, the infra-red light beam and the sonic sounds are non-detectable and harmless to the operator or the surrounding environment.

It should be understood that a conventional motorcycle battery 56 supplies power to the cycle borne IR or sonic transmitting systems.

While there have been shown and described preferred embodiments of the auxiliary stop light in accordance with the invention, it will be appreciated that many changes and modifications may be made therein without, however, departing from the essential spirit thereof.

What is claimed is:

1. In combination with a motorcycle or the like having brakes, an electrical power supply, a stop light switch and a stop light which illuminates when said stop light switch is switched from an "OFF" position to a "ON" position comprising:

a riders safety helmet;

a portable power supply carried by said safety helmet;

at least one light source for providing a beam of light outside of the visual light range carried by said motorcycle and connected to said motorcycle electrical power supply for shining that beam of light toward said riders helmet when said stop light switch is activated; and a receiving means positioned on said riders helmet for receiving said beam of light transmitted from said at least light source causing said auxiliary stop light to illuminate with power supplied from said portable power supply.

2. The invention as defined in claim 1 wherein said receiving means comprising a light detector tuned to the frequency of said at least one light source, a switching circuit connected to said light detector for switching power from said portable power supply to said auxiliary stop light for illumination thereof when said stop light switch is switched from "OFF" to "ON".

3. In combination with a motorcycle or the like having brakes, an electrical power supply, a stop light switch and a stop light which illuminates when said stop light switch is switched from an "OFF" position to a "ON" position comprising:

a rides safety helmet;

a portable power supply carried by said safety helmet;

at least one sound source for providing a sonic signal of a specific frequency outside of the audio sound range, said sound source carried by said motorcycle and connected to said motorcycle electrical power for transmitting a beam of sonic sound toward said riders helmet when said stop light switch is activated; and a receiving means positioned on said riders helmet for receiving said beam of sonic sound transmitted from said at least one sound source and operating said auxiliary light for illumination thereof.

4. The invention as defined in claim 3 wherein said receiving means comprising a sonic detector tuned to the frequency of said at least one sound source, a switching circuit connected to said receiving means for switching power from said portable power supply to said auxiliary stop light for illumination thereof when said stop light switch is switched from "OFF to "ON".

5. The invention as defined in claim 1 wherein said at least one light source comprises a first and second two light source.

6. The invention as defined in claim 1 including a second light source connected to said receiving means via a light transmission means.

7. The invention as defined in claim 6 wherein said light transmission means is an optic fiber.

8. In combination with a motorcycle or the like having brakes, an electrical power supply, a stop light switch and a stop light which illuminates when said stop light switch is switched from an "OFF" position to a "ON" position comprising:

a riders safety helmet;

a portable power supply carried by said safety helmet;

at least one sound source comprises a first and second sound source for providing a sonic signal of a specific frequency outside of the audio sound range, said sound source carried by said motorcycle and connected to said motorcycle electrical power supply for transmitting a beam of sonic sound toward said riders helmet when said stop light switch is activated; and said receiving means comprising a first and second receiving means connected in parallel with said first receiving means for operating said auxiliary stop light positioned on said riders helmet for receiving said beam of sonic sound transmitted from said at least one sound source and operating said auxiliary stop light for illumination thereof.

* * * * *